(12) United States Patent
Maxwell et al.

(10) Patent No.: US 8,157,948 B2
(45) Date of Patent: Apr. 17, 2012

(54) METHOD OF FABRICATING METAL- AND CERAMIC- MATRIX COMPOSITES AND FUNCTIONALIZED TEXTILES

(75) Inventors: James L. Maxwell, Jemez Springs, NM (US); Craig A. Chavez, Los Alamos, NM (US); Marcie R. Black, Lincoln, MA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 12/099,601

(22) Filed: Apr. 8, 2008

(65) Prior Publication Data
US 2009/0250844 A1 Oct. 8, 2009

(51) Int. Cl.
*B29C 35/08* (2006.01)
(52) U.S. Cl. .................................... 156/272.2; 156/267
(58) Field of Classification Search ............... 156/272.8, 156/272.2, 267
See application file for complete search history.

(56) References Cited

U.S. PATENT DOCUMENTS
| | | | |
|---|---|---|---|
| 4,575,330 A | 3/1986 | Hull | |
| 4,863,538 A | 9/1989 | Deckard | |
| 5,183,598 A * | 2/1993 | Helle et al. | 264/401 |
| 5,268,024 A * | 12/1993 | Moran | 106/1.27 |
| 5,512,162 A * | 4/1996 | Sachs et al. | 205/91 |
| 6,503,561 B1 * | 1/2003 | Senzaki et al. | 427/226 |

OTHER PUBLICATIONS

Lee, H.W. et al, High deposition rate laser direct writing of Al on Si, Applied Physics Letters, May 13, 1991, p. 2087-2089, 58.

* cited by examiner

*Primary Examiner* — Richard Crispino
*Assistant Examiner* — Daniel McNally
(74) *Attorney, Agent, or Firm* — Bruce H. Cottrell; Meredith H. Schoenfeld; Husch Blackwell, LLP

(57) ABSTRACT

A method of manufacturing an article comprises providing a first sheet, wetting the first sheet with a liquid precursor to provide a first wet sheet, and irradiating the first wet sheet in a pattern corresponding to a first cross section of the article such that the liquid precursor is at least partially converted to a solid in the first cross section. A second sheet is disposed adjacent to the first sheet. The method further comprises wetting the second sheet with the liquid precursor to provide a second wet sheet, and irradiating the second wet sheet in a pattern corresponding to a second cross section of the article such that the liquid precursor is at least partially converted to a solid in the second cross section. In particular the liquid precursor may be converted to a metal, ceramic, semiconductor, semimetal, or a combination of these materials.

17 Claims, 3 Drawing Sheets

METHOD OF FABRICATING METAL- AND CERAMIC- MATRIX COMPOSITES AND FUNCTIONALIZED TEXTILES

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF INVENTION

The present application relates generally metal and ceramic composites. More particularly, the application relates to methods of fabricating metal matrix composites, ceramic matrix composites, functionalized textiles, and rapid prototyping.

Rapid prototyping techniques have been developed for the rapid fabrication of parts based on computer assisted design (CAD) programs. Generally, these processes utilize data about a designed component that has been input into a CAD program. A computer uses the data to control a rapid prototyping system to create a three dimensional model of the component. The model may be useful in and of itself, or it may be used to produce molds that may in turn be used to make copies of the component.

There are a number of available techniques for rapid prototyping. U.S. Pat. No. 4,575,330 discloses methods of forming three dimensional models using stereo-lithography. Three dimensional models are built, layer by layer, from liquid photosensitive polymers that cure into a solid form when exposed to ultraviolet light. Models may be built upon a substrate that is submerged in a reservoir of the polymer. Liquid epoxies and/or acrylates may be used. An ultraviolet light source, such as a UV laser, patterns a cross section of the model. The UV light cures the liquid polymer to form a single layer of the three dimensional model.

The substrate and solidified layer are then lowered in the reservoir such that the solidified layer is covered with liquid polymer. The UV light source then patterns the second layer on top of the first. All the layers of the model are similarly formed until the entire component has been made. The component may then be removed from the reservoir.

Other techniques include laminated object manufacturing. Layers of paper having a heat sensitive adhesive coating are used to form a model component. A first layer is provided and the component cross section is patterned by a laser to cut the first layer of the component. A second layer of paper is positioned over the first, and the layers are bonded by a heated roller. The second component cross section is then cut with the laser and the process is repeated. Eventually, a solid block is produced with the component contained therein. The excess material is removed to provide the model component. The excess material areas of each layer may be cut by the laser during fabrication to facilitate removal of the excess material.

Laser sintering may also be employed as a rapid prototyping technique. U.S. Pat. No. 4,863,538 discloses methods for manufacturing three dimensional models by sintering plastic, ceramic, polymer, or metal powder. As in the other techniques, a model is built on a substrate. The substrate is covered with a layer of powder material. The cross section of the model is then pattered with a laser to sinter the powder to provide a solidified layer. An additional layer of powder is then spread over the first layer and the second layer of the model is patterned with a laser. The process is repeated until the model has been fabricated. This process allows for the formation of metal models, however the surfaces are generally grainy in nature as a result of the sintering process.

These techniques, while able to provide three dimensional models are limited in the types of materials that may be employed. For example, near net shape models made of metal and metal composites are difficult to form. Also, while metal powders may be used, the temperatures and/or other conditions required for sintering may prevent the effective use of metals with low temperature materials. Existing methods of rapid prototyping are not conducive to the formation of composites of metals with low temperature fibers such as cellulose, diamond, carbon nanotubes, aramids, Kevlar, silica, Teflon, and the like. Accordingly, it would be desirable to provide a method for the fabrication of prototypes that can utilize other materials and combinations of materials.

BRIEF SUMMARY OF INVENTION

One embodiment relates to a method of manufacturing an article. The method comprises providing a first sheet, wetting the first sheet with a liquid precursor to provide a first wet sheet, and irradiating the first wet sheet in a pattern corresponding to a first cross section of the article such that the liquid precursor is at least partially converted to a solid material in the first cross section. A second sheet is disposed adjacent to the first sheet, and the second sheet is wetted by the liquid precursor to provide a second wet sheet. The second wet sheet is irradiated in a pattern corresponding to a second cross section of the article such that the liquid precursor is at least partially converted to a solid material in the second cross section. At least a portion of one of the solid materials in the first cross section or the solid in the second cross section extends into the other of the first cross section or the second cross section, thereby coupling the first cross section to the second cross section.

Another embodiment relates to a method of manufacturing an article comprising a first sheet, wetting the first sheet with a first liquid metal (or ceramic) precursor to provide a first wet sheet, and irradiating the first wet sheet with a laser in a pattern corresponding to a first cross section of the article such that the first liquid metal (or ceramic) precursor is at least partially decomposed such that a solid metal (or ceramic) is deposited in the first cross section. A second sheet is disposed adjacent to the first sheet and wetted with a second liquid metal (or ceramic) precursor to provide a second wet sheet. The second wet sheet is irradiated with a laser in a pattern corresponding to a second cross section of the article such that the second liquid metal (or ceramic) precursor is at least partially decomposed such that a solid metal is deposited in the second cross section.

Yet another embodiment relates to a method of manufacturing an article comprising a first sheet comprising a fibrous or porous material. The first sheet is wetted with a first liquid metal (or ceramic) precursor to provide a first wet sheet and irradiated with a laser in a pattern corresponding to a first cross section of the article such that the first liquid metal (or ceramic) precursor is at least partially decomposed such that a solid metal (or ceramic) is deposited in the first cross section. The laser is computer controlled and the cross section is defined by data from a computer assisted design program. A second sheet is disposed adjacent to the first sheet and the second sheet is wetted with a second liquid metal precursor to provide a second wet sheet. The second wet sheet is irradiated with a laser in a pattern corresponding to a second cross section of the article such that the second liquid metal (or ceramic) precursor is at least partially decomposed such that a solid metal (or ceramic) is deposited in the second cross section. At least a portion of one of the solid in the first cross section or the solid in the second cross section extends into the other of the first cross section or the second cross section, thereby coupling the first cross section to the second cross section. This forms either a metal matrix composite (MMC) or a ceramic matrix composite (CMC) near-net shape. Three-dimensional structures much thicker than each layer may be grown at the surface of the near-net shape through wicking of the liquid metal or ceramic precursor.

DETAILED DESCRIPTION OF INVENTION

A process for forming metal matrix composites, ceramic matrix composites, and/or functionalized textiles, includes the decomposition of a liquid precursor that is present in a sheet of material to leave a solid decomposition product in the sheet. Rather than melt the metal, a laser is used to decompose one or more organometallic precursor, metal halide precursor, or similar precursors in liquid form that have soaked into a textile (or porous substrate) or other such sheet; these are decomposed by laser pyrolysis or photolysis to produce a solid metal or ceramic matrix within/around the textile or porous substrate. The metal or metals (or ceramics) are deposited below their melting points within the sheet layer. For rapid prototyping, the cross section of each layer of the prototyped part or component is patterned by the laser, then a subsequent layer (i.e., sheet) is added. The precursor is allowed to wick/soak into the second layer, and the next cross section is laser-patterned. Alternatively, the second sheet may be sprayed or otherwise soaked with the liquid precursor. As the liquid is allowed to wick/soak into each layer, three-dimensional extensions of each layer may project upwards, to connect to and intertwine with the subsequent layer(s), or provide functionality at the final surface layer. The liquid can project upwards many times the thickness of the original layer by means of the wicking action of the liquid onto the grown metal or ceramic extensions.

The laser deposition may occur on the fibers (or pores) of the sheet, within the liquid precursor, at the vapor-liquid-sheet interface, at the liquid sheet interface, and/or at a vapor-sheet interface. However, one aspect is that the precursor not only infiltrates through the sheet layer, but also wicks to the location of the laser-induced deposition zone, supplying fresh precursor to continue growth. In fact, we have observed 3-D growth of materials into the laser beam, with wicking of the liquid precursor vertically off the textile surface and up to the tip of the growing material; this could allow us to fabricate metallic fibers perpendicular to the surface that can help bond one or more successive layer(s).

The process also need not be performed in a planar layer, but can be performed on a curved surface. For example, each layer may be added to create a complicated 3-D structure. For example, a convoluted shape could be begun with fabric (or other suitable material) on an appropriate pre-form, then the liquid precursor sprayed on the fabric, the desired profile laser patterned, then one or more successive fabric layer(s) added, and so forth. Excess fabric outside the desired near net shape could simply be burned away with a torch (below the damage point of the metal or ceramic matrix and embedded fibers) or fabric dissolved and the part polished and finished.

Figure 1:
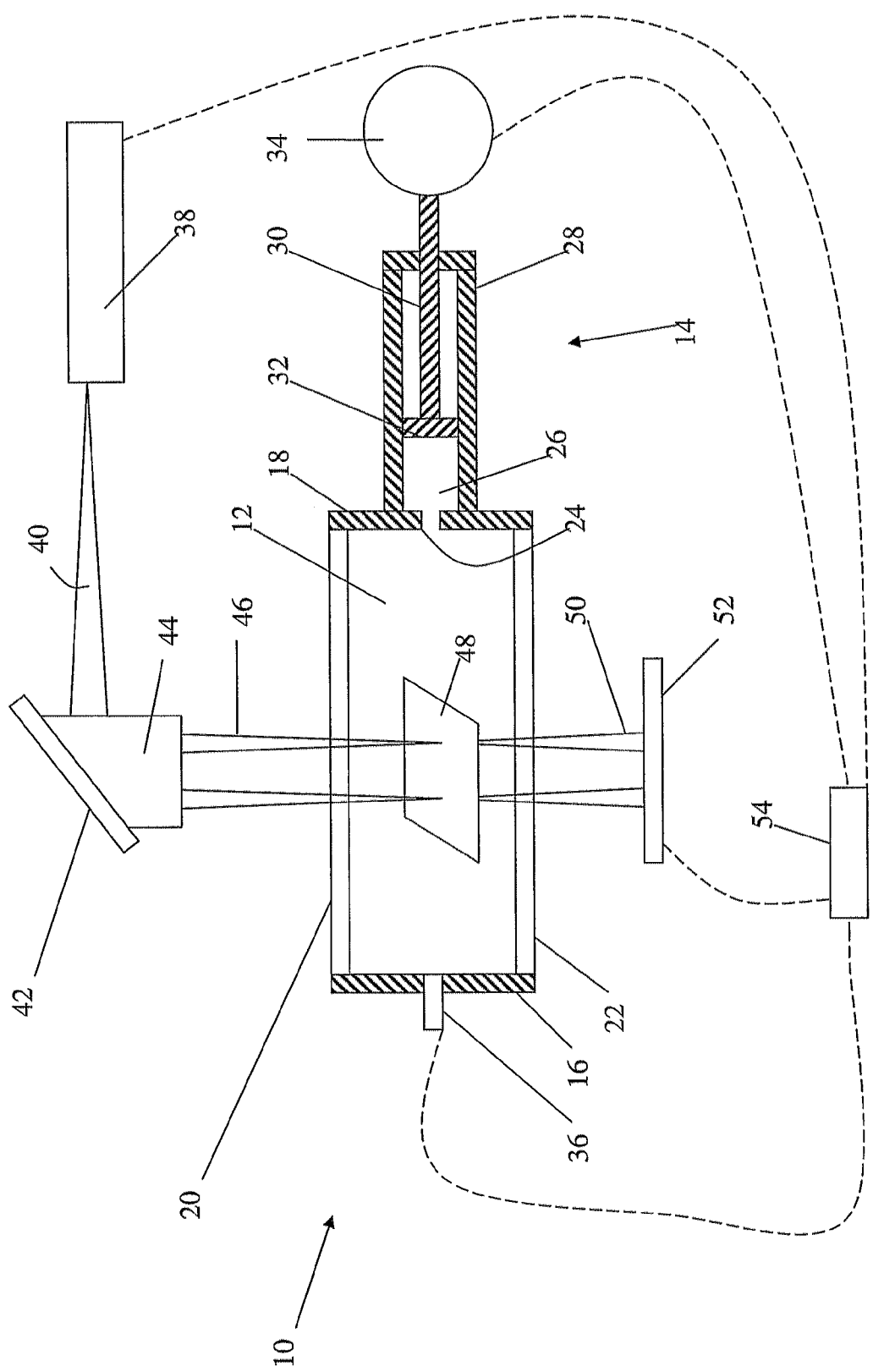
FIG. 1 is a schematic of an apparatus for forming functionalized texties

Also, the method can be performed at a vapor-liquid interface or completely immersed within the liquid (perhaps with vapor-phase precursor bubbles forming as the laser heats the reaction zone). In the latter case, the size and pressure of the bubbles can be controlled by enclosing the entire experiment and filling fully with the precursor liquid, as shown in FIG. 1. Using an "intensifier" (a piston-like device) to increase the liquid pressure, one can control the vapor-phase pressure of any bubbles that form. By increasing the pressure through the intensifier, much greater growth rates can be achieved, as any bubbles that form will be at high vapor pressures and very rapid mass transport can occur. In this way, scan rates can be increased and large-scale parts can be formed. For example, 100 micron wide aluminum lines have been deposited on cellulose fibers at scan rates exceeding 8 cm/s.

As shown in FIG. 1, system 10 includes a chamber 12 and an intensifier 14. Chamber 12 is defied by side wall 16, side wall 18, window 20, and window 22. Side wall 18 includes an aperture 24 that provides fluid communication between chamber 12 and chamber 26. Chamber 26 is defined by a casing 28 and includes piston 30 and piston head 32. Piston 30 and piston head 32 are configured such that displacement of piston head 32 may be used to adjust the pressure of chamber 12. Piston 3 is driven by a piston drive 34. Side wall 16 may include a pressure sensor 36 to monitor the pressure of chamber 12. Laser 38 is used to produce one or more beams 40, which are directed by mirror 42 towards chamber 12. Optical element 44 may be a differential optical element and combination of lens(es) or other optical element sufficient for properly focusing, splitting, and/or combining beams 46 that are directed toward target 48. Beams 50 may extend from target 48 to sensor 52 which may be used to measure the intensity of beams 50. Sensor 52 supplies data to controller 54 which in turn uses data from pressure sensor 36 and sensor 52 to control laser 40 and piston drive 34.

Automatic methods of measuring the bubble size (e.g. through a CCD inspection microscope or through simple reflection measurements) can also be used in conjunction with measurements of the incident laser power and intensifier pressure to control the induced bubble size and vapor pressure in real-time, and well as the laser-induced temperature of the reaction. Together, this enables greater resolution and control over the nano/microstructure and morphology of the deposited materials, and can help prevent damage of the fiber layers. For thin parts, comprised of very thin layers or just a few layers, transmission of the laser light through a window on the backside of the deposit can also be used to provide feedback of temperature, bubble size, potential damage to the fiber layers, etc. Micolensing and/or diffraction of the laser light through the bubble(s), can, in particular, be used as a measure of bubble(s) size and shape.

Similar to other prototyping and manufacturing techniques, the method can be fully automated. For example, the article to be manufactured may be designed using a CAD program. The designed part may then be "sliced" by a program to render a number of cross sections of a desired thickness. Thicknesses may generally be on the order of 0.1 mm, but other thicknesses may be selected depending on the sheet material used and the requirements for the article. Sheets of material may be automatically loaded onto a platform, and wetted by computer controlled sprayers, spreaders, dipping mechanisms, or other devices. The laser may trace a pattern provided by the computer program where the pattern corresponds to one of the sliced cross sections. Once the cross section has been patterned, a second sheet may be placed above the first, wetted and patterned according to the next cross sectional slice, and so forth.

In another embodiment, rather than use pre-made fabric, fibers may be randomly sprinkled on a surface, the precursor "wicked," sprayed, or otherwise applied to the fibers, and then the solid part can be continuously created by laser patterning the precursor/fiber mix. Alternatively, the fiber(s) may be spun or wrapped onto a surface, then processed as before.

Aluminum depositions have been grown at low temperature on/around fibers of porous low-temperature materials, such as fabrics—essentially encapsulating the fabric in a matrix of metal. In addition, long metal lines have been grown (infiltrating) fabric which would provide functionalizing fabrics with metals. Other applications for functionalizing substrates such as textiles include fabrication of passive and active microelectronic devices, e.g. capacitors, resistors, transistors, etc.

A larger variety of materials may be used for the sheet material. Various types of paper may be used to provide a cellulose/metal composite. Other natural fibers may also be used such as woven cotton. In rapid prototyping applications, the use of low temperature natural fibers facilitates the removal of the sheet material after fabrication of the prototype. The fibers may be burned, dissolved, or chemically modified and removed to yield a metal matrix prototype.

Alternatively, synthetic-fiber-based textiles may be used. For example, nylon, aramids, Kevlar, Teflon, and other such fibers may be used. Such fibers would not be suitable for applications that heat the metal to a point near its melting point. However, given the mild conditions at which laser decomposition can be carried out, metal composites may be made with these materials to provide unique and synergistic material, electrical, and other properties.

Figure 2:
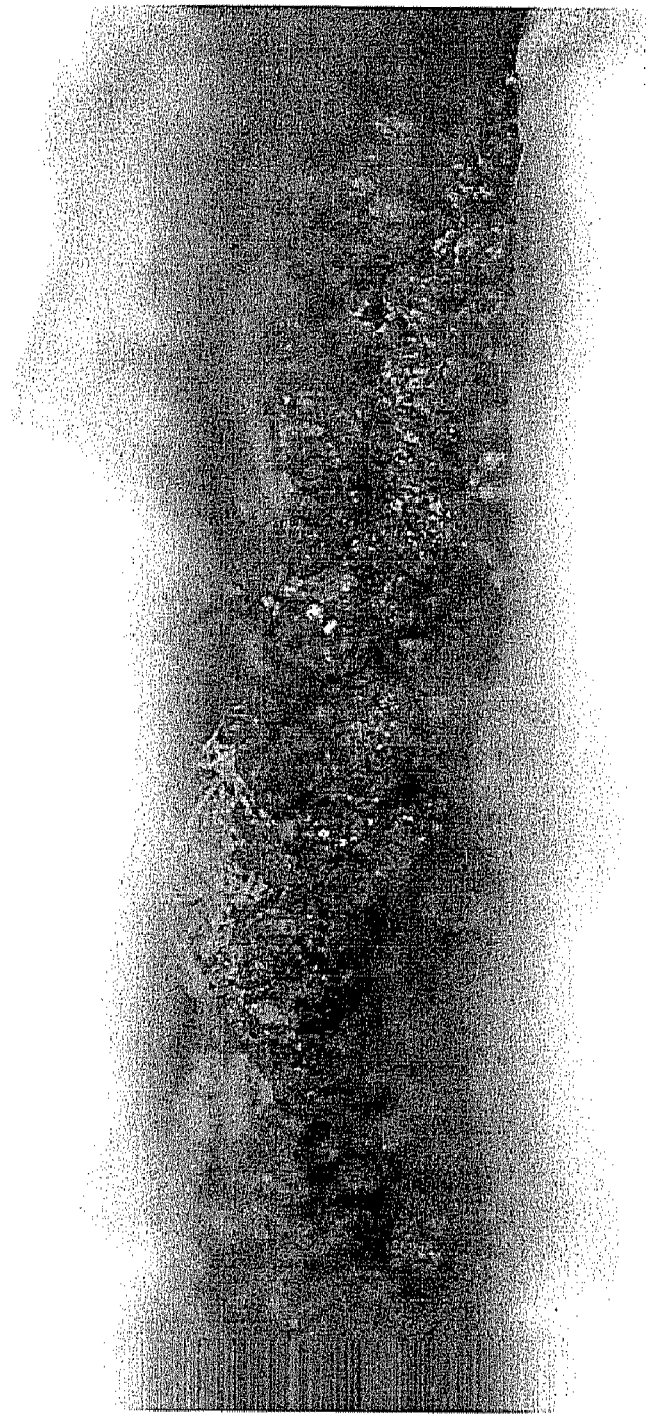
FIG. 2 is an image of aluminum lines deposited onto a cellulose layer.
Figure 3:
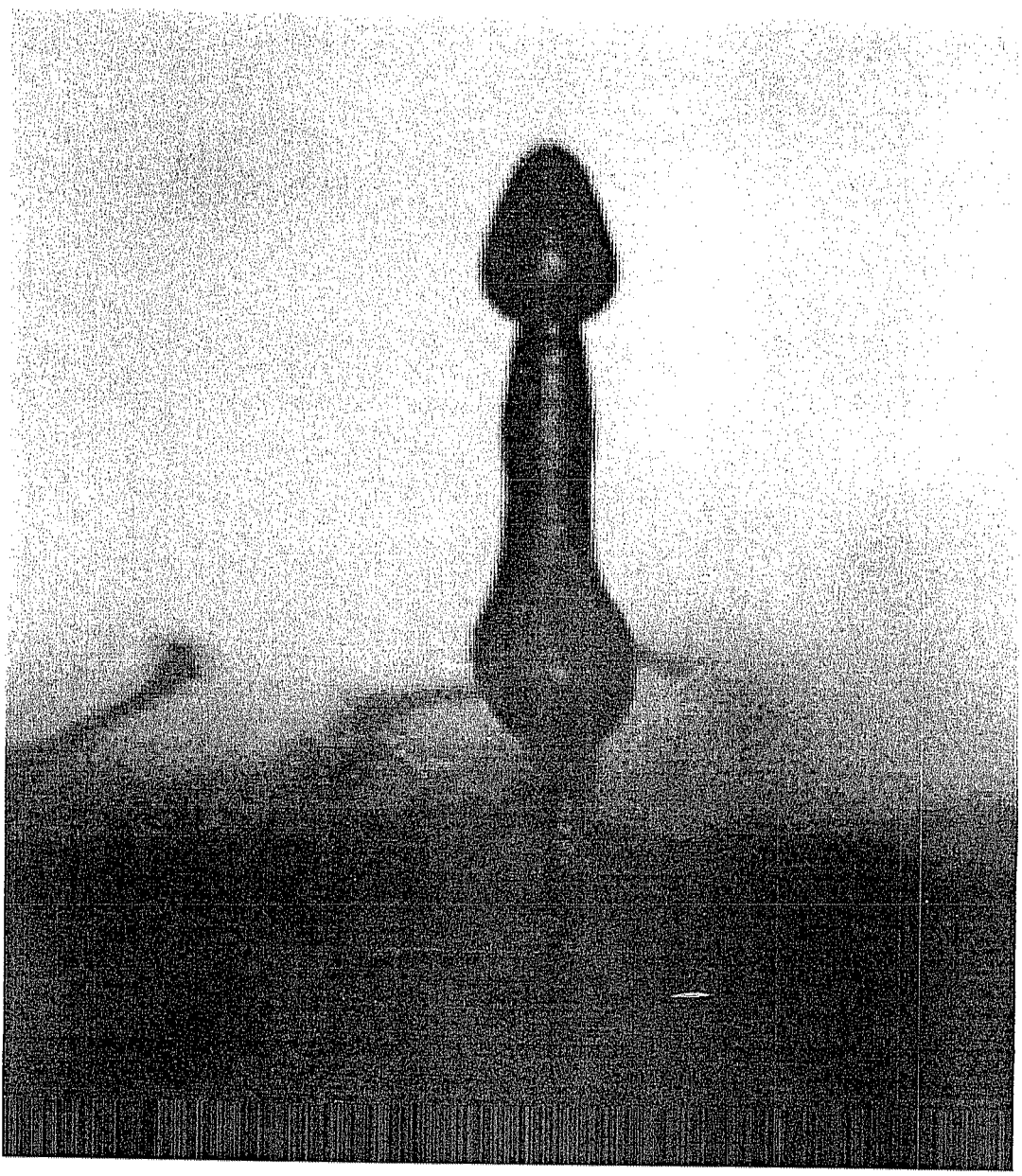
FIG. 3 is an image of fibers growing away from a layer of functionalized textile.

Further, a variety of liquid precursors may also be used. Some suitable precursors have been demonstrated; these are often metal organometallics or metal halides, but are not limited to such compounds. For example, solid deposits may be created from liquid chemicals such as tetraethoxysilane, titanium tetraiodide, triisobutylaluminum, trimethylindium, etc., providing solid deposits of silicon dioxide, titanium, aluminum, or indium, respectively. Any chemical that can be cleanly decomposed to provide a solid deposit matrix may be used, provided it can absorb or "wick" into the fiber layer(s). In fact, semiconductors, such as silicon, and semimetals, such as carbon and boron, can also be deposited, and the technique is not limited to metals or simple ceramics. As an example, consider the aluminum line(s) grown on cellulose fibers shown in FIG. 2-3. The lines of FIG. 2 were grown from triisobutylaluminum using a cw 532 nm beam at only 150-200 mW incident laser powers, while the vertical fiber shown in FIG. 3 was grown normal to the initial layer through wicking action of the triisobutylaluminum through the cellulose layers below and up the evolving aluminum fiber/projection.

Finally, there is no intrinsic limit on the number of laser spots or induced reactions that may be carried out simultaneously. For example, diffractive optics have been used in conjunction with the system of FIG. 1, to produce many aluminum lines at once.

Many changes, modifications, variations and other uses and applications of the present invention will, however, become apparent to those skilled in the art after considering this specification and the accompanying drawings. All such drawings, modifications, variations and other uses and applications which do not depart from the spirit and scope of the present invention are deemed to be covered by the present invention which is limited by the claims which follow.

What is claimed is:

1. A method of manufacturing an article comprising:
   providing a first sheet in a chamber;
   wetting the first sheet with a liquid precursor to provide a first wet sheet;
   pressurizing the chamber;
   irradiating the first wet sheet in the pressurized chamber, in a pattern corresponding to a first cross section of the article such that the liquid precursor is at least partially converted to a solid material in the first cross section;
   providing a second sheet disposed adjacent to the first sheet;
   wetting the second sheet with the liquid precursor to provide a second wet sheet;
   irradiating the second wet sheet in the pressurized chamber, in a pattern corresponding to a second cross section of the article such that the liquid precursor is at least partially converted to a solid material in the second cross section;
   wherein at least a portion of one of the solid in the first cross section or the solid in the second cross section extends into the other of the first cross section or the second cross section, thereby coupling the first cross section to the second cross section and further wherein irradiating of the first sheet and the second sheet includes irradiating the first and second sheets with a laser beam such that the liquid precursor is at least partially converted to a solid and the solid grows generally within the laser beam in a direction away from the first sheet and second sheet.

2. The method of claim 1, wherein the first sheet and the second sheet comprise the same material.

3. The method of claim 1, wherein the first sheet or the second sheet comprise a porous material, a fibrous material of natural or synthetic fibers, or a woven textile.

4. The method of claim 1, wherein the liquid precursor comprises an metal halide or metal organometallic.

5. The method of claim 1, wherein the steps of wetting the first sheet and wetting the second sheet comprise spraying the first sheet and the second sheet with the liquid precursor.

6. The method of claim 1, further comprising the step of removing excess sheet material adjacent to the first and second cross sections.

7. A method of manufacturing an article comprising:
   providing a first sheet in a chamber;
   pressurizing the chamber;
   wetting the first sheet with a first liquid precursor to provide a first wet sheet;
   irradiating the first wet sheet in the pressurized chamber with a laser in a pattern such that the first liquid precursor is at least partially decomposed such that a solid is deposited in the pattern
   wherein the liquid precursor comprises an organometallic precursor and further wherein irradiating the first sheet includes irradiating the first sheet with a laser beam such that the liquid metal precursor is at least partially converted to a solid metal and the solid grows generally within the laser beam in a direction away from the sheet and to a length greater than the thickness of the first sheet.

8. The method of claim 7, further comprising:
   providing a second sheet disposed adjacent to the first sheet;
   wetting the second sheet with a second liquid precursor to provide a second wet sheet; irradiating the second wet sheet with a laser in a pattern corresponding to a second cross section of the article such that the second liquid precursor is at least partially decomposed such that a solid is deposited in the second cross section; and wherein the pattern irradiated on the first wet sheet corresponds to a first cross section of the article and further wherein irradiating of the first sheet and the second sheet include irradiating the first and second sheets with a laser beam such that the liquid precursor is at least partially converted to a solid and the solid grows generally within the laser beam in a direction away from the sheet and to a length greater than the thickness of the first sheet and second sheet.

9. The method of claim 8, wherein at least a portion of one of the solid in the first cross section or the solid in the second cross section extends into the other of the first cross section or the second cross section, thereby coupling the first cross section to the second cross section.

10. The method of claim 8 wherein the first and second liquid precursor comprise the same material.

11. The method of claim 8 wherein, one or both of the first and second liquid precursors comprises a plurality of liquid precursors such that the solid deposited in one or both of the first and second cross sections comprises more than one material.

12. The method of claim 8, wherein the first sheet and the second sheet comprise the same material.

13. The method of claim 8, wherein the first sheet or the second sheet comprise a porous material, a fibrous material of natural or synthetic fibers, or a woven textile.

14. The method of claim 8, wherein the liquid precursors comprise one or more metal-halides, one or more organometalics, or mixtures thereof.

15. The method of claim 8, wherein the steps of wetting the first sheet and wetting the second sheet comprise spraying the first sheet and the second sheet with the liquid metal precursor.

16. The method of claim 8, further comprising the step of removing excess sheet material adjacent to the first and second cross sections.

17. An automated method of manufacturing an article comprising:
 providing a first sheet comprising a fibrous or porous material in a chamber;
 pressurizing the chamber;
 wetting the first sheet with a first liquid metal precursor to provide a first wet sheet;
 irradiating the first wet sheet in the pressurized chamber with a laser in a pattern corresponding to a first cross section of the article such that the first liquid metal precursor is at least partially decomposed such that a solid metal is deposited in the first cross section, wherein the laser is computer controlled and the cross section is defined by data from a computer assisted design program;
 providing a second sheet disposed adjacent to the first sheet;
 wetting the second sheet with a second liquid metal precursor to provide a second wet sheet;
 irradiating the second wet sheet in the pressurized chamber with a laser in a pattern corresponding to a second cross section of the article such that the second liquid metal precursor is at least partially decomposed such that a solid metal is deposited in the second cross section;
 wherein at least a portion of one of the solid in the first cross section or the solid in the second cross section forms a structure having a length greater than a thickness of both the first sheet and the second sheet, and extends into the other of the first cross section or the second cross section, thereby coupling the first cross section to the second cross section.

* * * * *